United States Patent
Kim

(10) Patent No.: US 11,449,449 B2
(45) Date of Patent: Sep. 20, 2022

(54) DATA PROCESSING APPARATUS AND OPERATING METHOD THEREOF

(71) Applicant: SK hynix Inc., Icheon (KR)

(72) Inventor: Ki Young Kim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/997,256

(22) Filed: Aug. 19, 2020

(65) Prior Publication Data
US 2021/0255978 A1    Aug. 19, 2021

(30) Foreign Application Priority Data
Feb. 14, 2020    (KR) .................. 10-2020-0018504

(51) Int. Cl.
| | |
|---|---|
| G06F 13/372 | (2006.01) |
| G06F 13/374 | (2006.01) |
| G06F 1/14 | (2006.01) |
| G06F 9/38 | (2018.01) |
| G06F 9/48 | (2006.01) |

(52) U.S. Cl.
CPC ............ G06F 13/372 (2013.01); G06F 1/14 (2013.01); G06F 9/3859 (2013.01); G06F 9/4881 (2013.01); G06F 13/374 (2013.01)

(58) Field of Classification Search
CPC .. G06F 13/372; G06F 13/374; G06F 13/4031; G06F 13/1605; G06F 1/14; G06F 9/3859; G06F 9/4881
USPC ................................................. 710/117, 309
See application file for complete search history.

(56) References Cited

U.S. PATENT DOCUMENTS

| | | | | |
|---|---|---|---|---|
| 7,120,714 | B2 * | 10/2006 | O'Connor ............. | G06F 13/364 710/243 |
| 7,263,566 | B2 * | 8/2007 | Ganasan ............... | G06F 13/364 709/211 |
| 7,447,817 | B1 * | 11/2008 | Sripada ................. | G06F 13/362 710/113 |
| 7,930,456 | B1 * | 4/2011 | Davis ..................... | H04L 29/06 710/120 |
| 7,975,086 | B1 * | 7/2011 | Spitzer .................. | G06F 13/364 710/107 |

(Continued)

FOREIGN PATENT DOCUMENTS

KR    101182018    9/2012

*Primary Examiner* — Brian T Misiura

(57) ABSTRACT

A data processing apparatus includes a master device configured to transmit commands for destinations, a slave device including a plurality of command processing regions respectively corresponding to the destinations, and a controller configured to relay communication between the master device and the slave device. The controller assigns time stamp value to the commands as an initial value when the commands was received by the controller and increment the time stamp value every command arbitration cycle, selects a command having a largest time stamp value among the commands in a tournament manner by comparing commands having different destinations every command arbitration cycle, stores a command selection history of each comparison of commands, selects the command based on a command selection history corresponding to the compared commands when respective time stamp values of the compared commands are the same or substantially the same as each other.

15 Claims, 9 Drawing Sheets

(56) References Cited

U.S. PATENT DOCUMENTS

| | | | | |
|---|---|---|---|---|
| 8,688,881 | B2* | 4/2014 | Naylor | G06F 13/374 |
| | | | | 710/243 |
| 8,793,421 | B2* | 7/2014 | Miller | G06F 13/1663 |
| | | | | 710/112 |
| 10,866,910 | B2* | 12/2020 | Benisty | G06F 13/1642 |
| 2006/0156304 | A1 | 7/2006 | Bourzeix et al. | |
| 2007/0174529 | A1* | 7/2007 | Rodriguez | G06F 13/362 |
| | | | | 710/240 |
| 2009/0055566 | A1* | 2/2009 | Reinig | G06F 13/1615 |
| | | | | 710/243 |
| 2011/0208887 | A1* | 8/2011 | Chen | G06F 13/362 |
| | | | | 710/241 |
| 2014/0019655 | A1* | 1/2014 | Jeloka | G11C 7/10 |
| | | | | 710/116 |
| 2016/0103619 | A1* | 4/2016 | Lai | G06F 13/1626 |
| | | | | 711/154 |
| 2021/0073162 | A1* | 3/2021 | Ahn | G06F 13/4031 |

* cited by examiner

DATA PROCESSING APPARATUS AND OPERATING METHOD THEREOF

CROSS-REFERENCES TO RELATED APPLICATION

The present application claims priority under 35 U.S.C. § 119(a) to Korean application number 10-2020-0018504, filed on Feb. 14, 2020, in the Korean Intellectual Property Office, which is incorporated herein by reference in its entirety.

BACKGROUND

1. Technical Field

Various embodiments may generally relate to a semiconductor integrated device, and more particularly, to a data processing apparatus and an operating method thereof.

2. Related Art

Various arbitration techniques have been studied to improve access efficiency to shared resources such as shared memories in a semiconductor integrated device in which a plurality of devices are integrated.

Priority and latency for commands may be considered when arbitrating the commands transmitted from at least one master device to a slave device, and an arbitration methodology may be required to accomplish maximum power efficiency and minimum latency while fully using the shared resources through consideration of the priority and latency.

SUMMARY

In an embodiment, the data processing apparatus selects between (or amongst) candidate commands for issuing to a slave device having multiple processing destinations using an arbitration history when time stamps for the candidate commands are deemed inappropriate criterion for selecting from the candidate commands, e.g., when the stamp values of two or more of the commands are the same or substantially the same.

In an embodiment of the present disclosure, a data processing apparatus may include: a master device configured to transmit commands for destinations; a slave device including a plurality of command processing regions respectively corresponding to the destinations; and a controller configured to relay communication between the master device and the slave device. The controller assigns time stamp value to the commands as an initial value when the commands was received by the controller and increment the time stamp value every command arbitration cycle, selects a command having a largest time stamp value among the commands in a tournament manner by comparing commands having different destinations every command arbitration cycle, stores a command selection history of each comparison of commands, selects the command based on a command selection history corresponding to the compared commands when respective time stamp values of the compared commands are the same or substantially the same as each other.

In an embodiment of the present disclosure, a data processing apparatus may include: a master device configured to transmit commands for destinations; a slave device including a plurality of command processing regions respectively corresponding to the destinations; and a controller configured to relay communication between the master device and the slave device. The controller includes: a time stamp setter configured to assign time stamp values to each of the commands as an initial value when the commands was received by the controller; a counter configured to increment the time stamp value every command arbitration cycle; a command register configured to store time stamp-assigned commands according to an arrival order; and a scheduler configured to classify the time stamp-assigned commands according to the destinations and based on the arrival order, and select any one of leading commands for the destinations based on the time stamp values, the scheduler selecting a command based on a command selection history of a previous command arbitration cycle.

In an embodiment of the present disclosure, an operating method of a data processing apparatus which includes controller, a master device, and a slave device, the method comprising: assigning time stamp value to each of the commands as an initial value when the commands was received by the controller and storing time stamp-assigned commands therein; incrementing the time stamp value every command arbitration cycle; classifying the time stamp-assigned commands according to destinations based on an arrival order; selecting any one of leading commands for the destinations based on the time stamp values; and selecting a command based on a command selection history of a previous command arbitration cycle.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present teachings are described in detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to illustrations of idealized embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
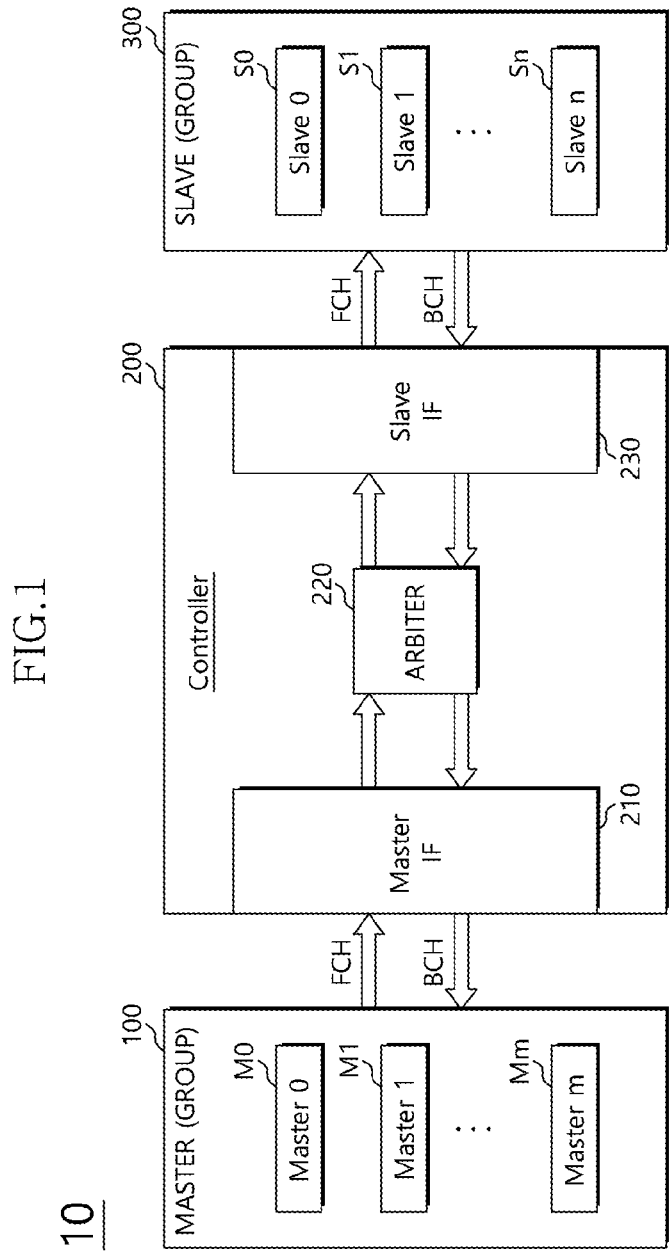
FIG. 1 illustrates a configuration of a data processing apparatus according to an embodiment of the present disclosure.

FIG. 1 is a diagram illustrating a configuration of a data processing apparatus 10 according to an embodiment.

The data processing apparatus 10 according to an embodiment may include a master device 100, a slave device 300, and a controller 200.

The master device 100 may include at least one master intellectual property (IP) M0 to Mm and the slave device 300 may include at least one slave IP S0 to Sn.

The master device 100 may correspond to a host device. The master device 100 may include various processors such as a central processing unit (CPU), a graphic processing unit (GPU), and an application processor, a direct memory access (DMA) device, an input/output sub system, or the like, which may respectively correspond to the master IP M0 to Mm.

In an embodiment, the master device 100 may transmit a command including a slave address, which is information indicating a destination in which the command is to be processed, through a forward channel FCH, and receive a response signal through a backward channel BCH. When the command is a write command, the master device 100 may transmit the command further including data in addition to the slave address and when the command is a read command, the master device 100 may receive data according to a command processing result with the response signal.

The slave device 300 may be a resource shared by the master device 100. In an embodiment, the slave device 300 may be a shared memory device. In an embodiment, the slave device 300 may receive a command from the master device 100 through the forward channel FCH and transmit the data according to a command processing result and a response signal to the master device 100 through the backward channel BCH.

The address, data, and response signal may be respectively transmitted between the master device 100 and the slave device 300 through independent channels, but embodiments are not limited thereto.

The controller 200 may be configured to relay communication between the master device 100 and the slave device 300 and may be an interconnector which provides logical/physical environments which can exchange the command, data, and response signal between the master device 100 and the slave device 300. In embodiments, the controller 200 may function as a component in one or both of the front channel FCH and the back channel BCH. The controller 200 may include a master interface 210, an arbiter 220, and a slave interface 230.

The master interface 210 may receive the command of the master device 100 through the forward channel FCH and transmit the received command to the arbiter 220, and may transmit the data and/or the response signal provided from the slave device 300 to the master device 100 through the backward channel BCH.

The arbiter 220 may be configured to schedule the commands of the master device 100 transmitted through the forward channel FCH according to a priority and a latency.

The slave interface 230 may transmit the scheduled commands to the slave device 300 through the forward channel FCH, and may receive the data and/or the response signal output from the slave device 300 through the backchannel BCH and transmit the received data and/or response signal to the master device 100.

The command transmitted from the master device 100 may include a destination address indicating where the command is to be processed. The slave device 300 may be a memory device including a plurality of storage devices, for example, a plurality of memory banks respectively operating as destinations, and in such a case, the destination address may include a bank address indicating a memory bank of the plurality of memory banks.

In an embodiment, the arbiter 220 may assign time stamps to the commands received from the master device 100 and store the time stamp-assigned commands according to an arrival order. The arbiter 220 may count, for example, increment the time stamp assigned to each command every command arbitration cycle. In an embodiment, initial values of time stamps assigned to commands may be a constant, such as, for example, 1, but embodiments are not limited thereto.

In an embodiment, the arbiter 220 may select a command having a largest time stamp value in a tournament manner by using one or more comparison stages to compare commands having different destinations in pairs every command arbitration cycle, and may store command selection histories in each comparison stage. The arbiter 220 may select the command based on the command selection history of a previous command arbitration cycle when the time stamp values of commands in each command pair to be compared (for example, comparison target commands) are the same as each other.

In an embodiment, the arbiter 220 may sequentially receive the commands according to the arrival order, classify the received commands according to the destinations, and select one of leading commands classified according to the destinations (e.g., a command selected from the respective oldest unprocessed commands for the destinations) based on the time stamps. When the time stamp values of the comparison target commands are the same or cannot be compared, the arbiter 220 may select a command of a destination unselected in the previous command arbitration cycle with reference to the command selection history of the previous command arbitration cycle. For example, in an embodiment, when a first command for a first destination is compared to a second command for a second destination and the two commands have the same time stamp value, then if a command for the first destination was selected in the previous command arbitration cycle, the second command for the second destination is selected; but if a command for the second destination was selected in the previous command arbitration cycle, then the first command for the first destination is selected.

According to the present technology as described above, the arbiter 220 may provide a command, which has the largest time stamp value among the commands of the slave device 300 received for the destinations, to a corresponding destination to be processed.

The time stamp of each command queued for processing in the arbiter 220 may be incremented every command arbitration cycle and may converge to a maximum value while the command is waiting in an unprocessed state. The arbiter 220 may select a command of a destination unselected in the previous command arbitration cycle when time stamp values of commands having the same arrival time the controller 200 are compared or when time stamp values of commands which have time stamp values converged to the maximum value are compared.

The arbiter 220 may allow a command for a destination, of which an arrival time to the controller 200 has priority, to be preferentially processed. Moreover, the commands for a specific destination may be prevented from being preferentially processed or the processing of the commands for the specific destination may be prevented from being starved and thus the commands for the destinations may be uniformly processed.

Figure 2:
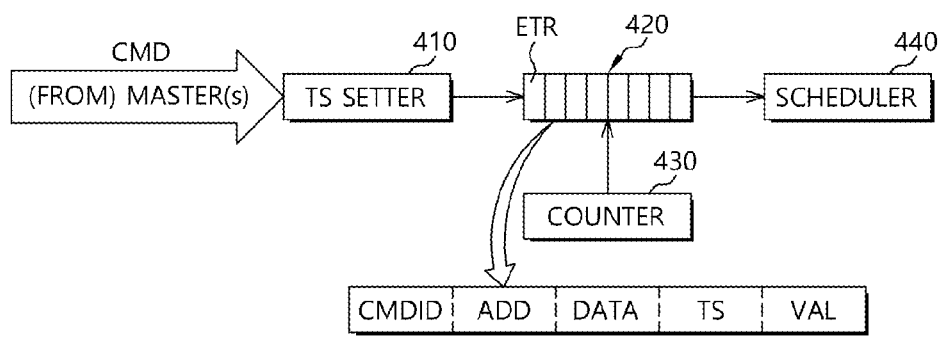
FIG. 2 illustrates a configuration of an arbiter according to an embodiment of the present disclosure.

FIG. 2 is a diagram illustrating a configuration of an arbiter according to an embodiment.

Referring to FIG. 2, the arbiter 220 according to an embodiment may include a time stamp (TS) setter 410, a command register 420, a counter 430, and a scheduler 440.

When the controller 200 receives a command CMD transmitted by a master device 100, the command CMD including a destination address and (for some commands) data, the TS setter 410 may assign a time stamp TS to an initial value at a point of time that the command CMD was received by the controller 200 and store the time stamp (TS)-assigned command in the command register 420.

The command register 420 may store the time stamp (TS)-assigned command in each of entries ETR according to an order of input to the controller 200. In an embodiment, the command register 420 may be a first-in first-out (FIFO) buffer, but embodiments are not limited thereto. In an embodiment, a command register 420 may be provided for each of a plurality of slave devices or for each of destinations (banks) of the plurality of slave devices. The command register 420 may be commonly provided in the plurality of slave devices or in the destinations (banks) constituting the plurality of slave devices.

In each entry ETR of the command register 420, a command identifier (ID) CMD ID, a destination address ADD, data DATA (in case of a write command), a time stamp value TS, and a command validity flag VAL may be stored. The command ID CMD ID may indicate a command type, for example, whether the command is write command or the read command. The destination address ADD may correspond to a location within the slave device 300 relevant to a corresponding command to be processed. When the slave device 300 is a shared memory device including a plurality of memory banks, the destination address ADD may include a bank address, but embodiments are not limited thereto. The time stamp value TS may indicate command arrival time information assigned by the TS setter 410. The validity flag VAL may indicate a processing state of the corresponding command, for example, indicate whether the command processing is completed, for example, the validity flag VAL indicating 'valid' may indicate that the corresponding command is waiting to be processed.

The counter 430 may count, for example, increment the time stamp value of each TS-assigned command every command arbitration cycle after the time stamp-assigned command is stored in the command register 420. In an embodiment, a time stamp value of a time stamp-assigned command may correspond to an amount of time that the TS-assigned command has been stored in the command register 420. In an embodiment, more than one command may arrive at the arbiter 220 during a command arbitration cycle, and accordingly a plurality of TS-assigned commands may have a same time stamp value.

The scheduler 440 may select a command having the largest time stamp value TS in a tournament manner by comparing commands having different destination addresses ADD in pairs every command arbitration cycle, and may store the command selection history of each comparison stage. When the time stamp values TS of the comparison target commands are the same as each other, the scheduler 440 may select the command based on the command selection history of the previous command arbitration cycle.

In another aspect, the scheduler 440 may classify the commands stored in the command register 420 according to the destinations, and based on the arrival time may select one of leading commands classified according to the destinations based on the time stamps. For example, in an embodiment having a plurality of command registers 420 respectively corresponding to a plurality of destinations, the scheduler 440 may receive the leading command (e.g., the oldest unprocessed command) from each command register 420 as comparison target commands, and select one command from among the comparison target commands according to their time stamp values. When the time stamp values of two comparison target commands are the same as each other, the arbiter 220 may select a command intended for a destination unselected in the previous command arbitration cycle using the command selection history of the previous command arbitration cycle.

Figure 3:
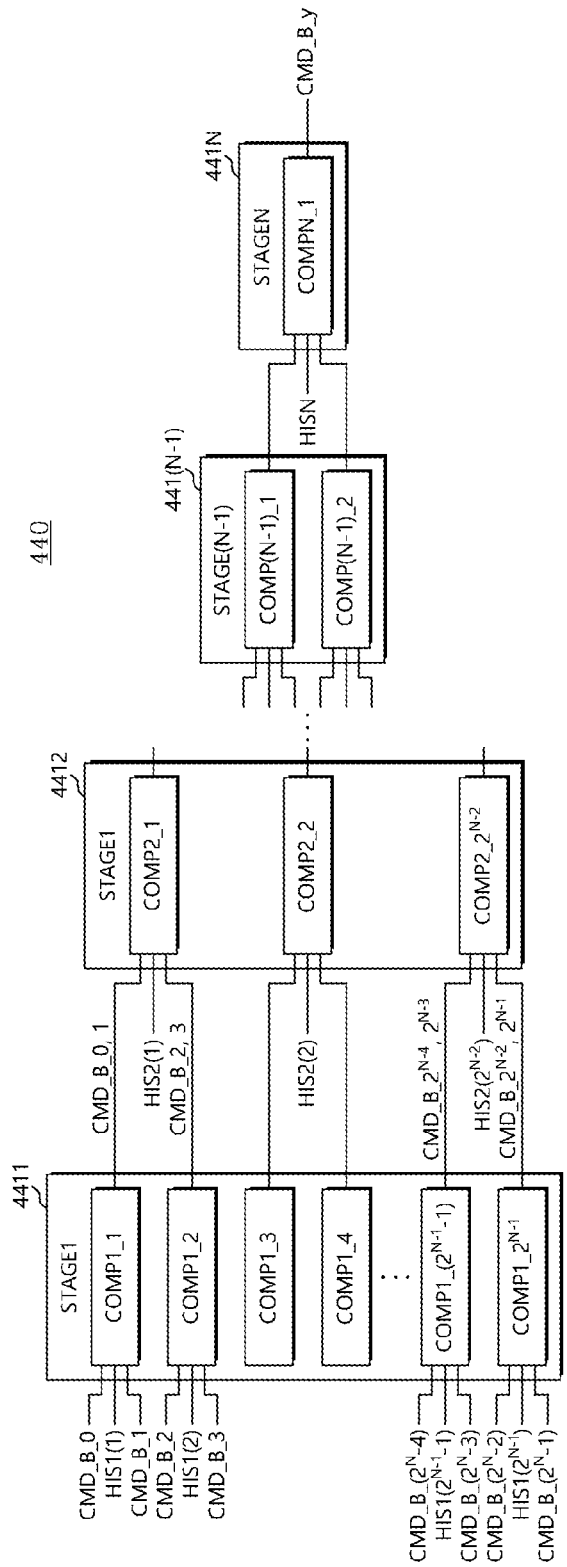
FIG. 3 illustrates a configuration of a scheduler according to an embodiment of the present disclosure.

FIG. 3 is a diagram illustrating a configuration of a scheduler 440 according to an embodiment.

The scheduler 440 according to an embodiment may include a plurality of comparison stages 4411 to 441N and each of the plurality of comparison stages 4411 to 441N may include one or more comparison circuits.

When it is assumed that the number of destinations is $2^N$, the scheduler 440 may include N comparison stages 4411 to 441N. Each of the comparison stages 4411 to 441N may include $2^{(N-m)}$ comparison circuits COMP m_$(2^{(N-m)})$. Here, N and m are natural numbers and m represents a stage sequence number.

Commands CMD_B_x having different destinations may be input to each of the comparison stages 4411 to 441N and each of comparison circuits COMP m_$(2^{(N-m)})$ in the comparison stages 4411 to 441N may select a command having the larger time stamp value by comparing time stamp values of a pair of commands having different destinations. Here, x may be address of a destination among the plurality of destinations in a slave device. Information regarding the selecting of the command by the comparison circuit COMP m_$(2^{(N-m)})$ may be fed back to an input terminal of the comparison circuit as a command selection history HIS_m_$(2^{(N-m)})$. In another aspect, when each comparison circuit COMP m_$(2^{(N-m)})$ switches any one of input commands to an output terminal based on the time stamps, the comparison circuit COMP m_$(2^{(N-m)})$ may feed back the switching information to the input terminal.

In an embodiment, $2^N$ commands CMD_B_0 to CMD_B_$(2^N-1)$ each having different destinations may be input to the first comparison stage 4411; in an embodiment wherein a plurality of command registers 420 are respectively provided for the destinations, each of the commands CMD_B_0 to CMD_B_(2N-1) may come from a respective command register 420 of the plurality of command registers 420. $2^{N-1}$ comparison circuits COMP 1_1 to COMP 1_$2^{N-1}$ may compare the $2^N$ commands in pairs to select any one command of each command pair, respectively. The command selection histories HIS 1(1) to HIS 1($2^{N-1}$) which are selection information of the comparison circuits COMP 1_1 to COMP 1_$2^{N-1}$ may be fed back to input terminals of the comparison circuits in the first comparison stage 4411. Accordingly, half (for example, $2^{N-1}$ commands) of $2^N$ commands may be selected in the first comparison stage 4411.

As the comparison operation progresses from the second comparison stage 4412 to the N-th comparison stage 441N, the number of commands output from each of the comparison stages 4412 to 441N may be half of the respective input commands to each stage, which input commands are the commands selected and output from the comparison circuits of the previous comparison stages 4411 to 441(N−1), and one command CMD_B_y may be selected and output from the final comparison stage 441N.

Figure 4:
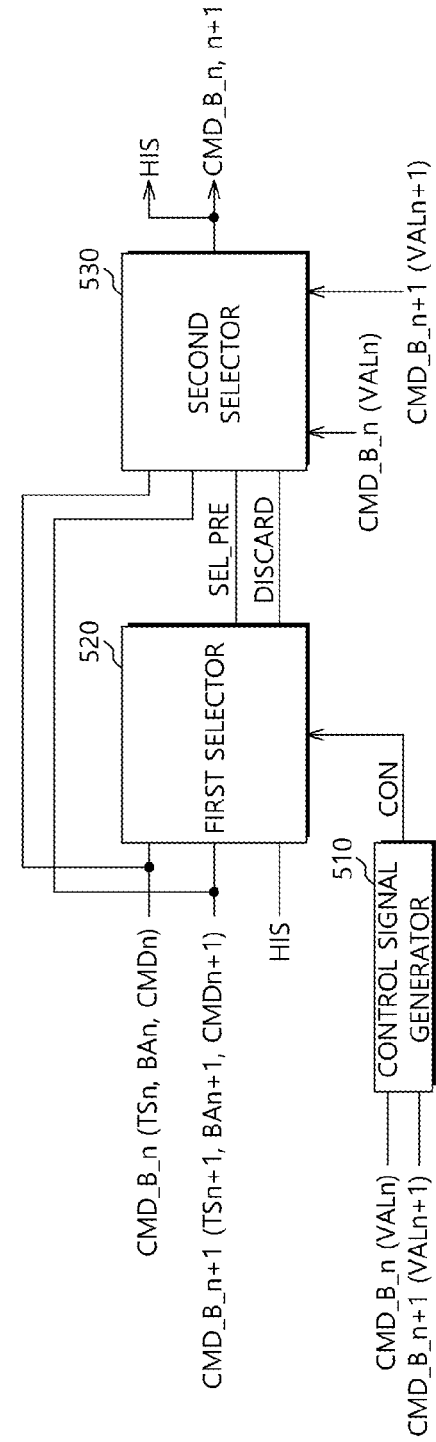
FIG. 4 illustrates a configuration of a comparison circuit according to an embodiment of the present disclosure.

FIG. 4 is a diagram illustrating a configuration of a comparison circuit according to an embodiment.

Referring to FIG. 4, the comparison circuit COMP may include a control signal generator 510, a first selector 520, and a second selector 530.

The comparison circuit COMP may receive a pair of commands CMD_B_n and CMD_B_n+1 and the pair of commands CMD_B_n and CMD_B_n+1 may respectively include time stamps TSN and TSN+1, destination addresses BAn and BAn+1, command types CMDn and CMDn+1, and validity flags VALn and VALn+1.

The control signal generator 510 may be configured to output a control signal CON based on the validity flags VALn and VALn+1 of the pair of input commands CMD_B_n and CMD_B_n+1.

In an embodiment, the control signal generator 510 may generate the control signal CON having an enabled state when any one of the pair of commands CMD_B_n and CMD_B_n+1 is valid, based on the validity flags VALn and VALn+1 of the pair of commands CMD_B_n and CMD_B_n+1. The control signal generator 510 may generate the control signal CON having a disabled state when both of the pair of commands CMD_B_n and CMD_B_n+1 are invalid.

The first selector 520 may be enabled in response to the control signal CON, receive the pair of commands CMD_B_n and CMD_B_n+1, receive the command selection history HIS generated by the second selector 530 in the previous command arbitration cycle, and output a preliminary select signal SEL_PRE indicating any one of the commands CMD_B_n and CMD_B_n+1 as a preliminarily selected command.

In an embodiment, when both of the pair of input commands CMD_B_n and CMD_B_n+1 are in an unprocessed state (e.g., when both of the validity flags VALn and VALn+1 indicate valid), the first selector 520 may determine the preliminary select signal SEL_PRE based on the time stamps TSn and TSn+1. When the time stamp values TSn and TSn+1 of the input commands are the same as each other, the first selector 520 may select a command having a different destination BAn+1 or BAn from a destination BAn or BAn+1 selected in the previous command arbitration cycle, with reference to the command selection history HIS. When only any one of the pair of commands CMD_B_n and CMD_B_n+1 is in an unprocessed state, the first selector 520 may output the preliminary select signal SEL_PRE indicating the unprocessed command. When the control signal CON has the disabled state, the first selector 520 may output a discard signal DISCARD indicating that no command has been selected.

The second selector 530 may receive the pair of commands CMD_B_n and CMD_B_n+1, the preliminary select signal SEL_PRE, and the discard signal DISCARD output from the first selector 520 as input signals and output a command select signal CMD_B_n,n+1 based on the validity flags VALn and VALn+1 of the pair of commands CMD_B_n and CMD_B_n+1.

In an embodiment, when both the pair of commands CMD_B_n and CMD_B_n+1 are valid (for example, when both are unprocessed), based on the validity flags VALn and VALn+1 of the pair of input commands CMD_B_n and CMD_B_n+1, the second selector 530 may output the command indicated by the preliminary select signal SEL_PRE output by the first selector 520 as the command select signal CMD_B_n,n+1.

When only one of the pair of input commands CMD_B_n and CMD_B_n+1 is valid (for example, when only one is unprocessed), based on the validity flags VALn and VALn+1 of the pair of input commands CMD_B_n and CMD_B_n+1, the second selector 530 may output the unprocessed command as the command select signal CMD_B_n,n+1.

When both the validity flags VALn and VALn+1 of the pair of commands CMD_B_n and CMD_B_n+1 are invalidated, for example, when the processing of both of the commands is completed, the second selector 530 may output the discard signal DISCARD as the command select signal CMD_B_n,n+1 and thus the commands may not be selected and may be neglected. In an embodiment, a next stage of the scheduler 440 that receives the discard signal DISCARD as the command select signal CMD_B_n,n+1 may determine that the command select signal CMD_B_n,n+1 is not valid. In an embodiment, outputting the discard signal DISCARD may correspond to outputting a command select signal CMD_B_n,n+1 having a validity flag VALn,n+1 set to invalid.

When any one of the input commands is output as the command select signal CMD_B_n,n+1, the command selection history HIS may be fed back to an input terminal of the first selector 520 as the selection information for outputting the selected command and may be referenced in next command arbitration cycle. The command selection history includes an indication of the destination of the BAn,n+1 of the command select signal CMD_B_n,n+1.

Figure 5:
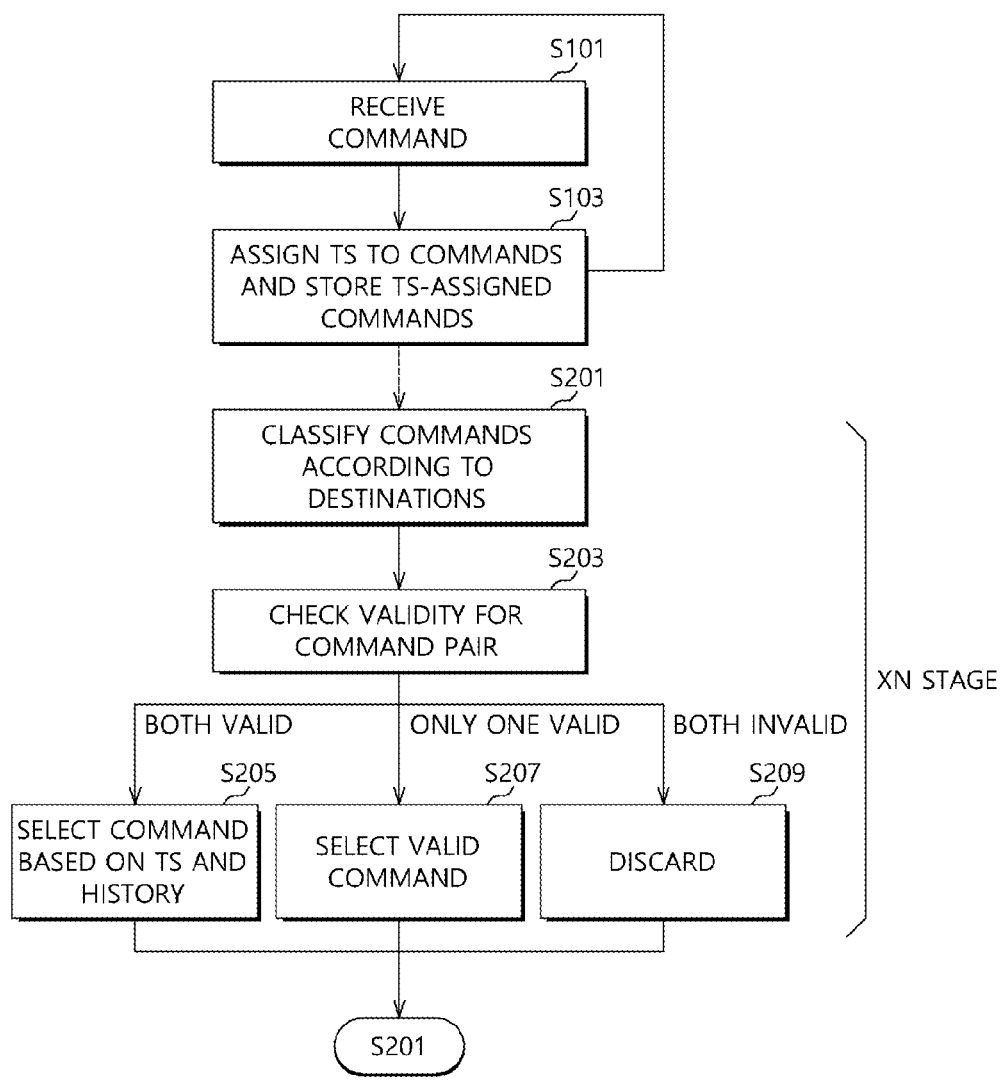
FIGS. 5 and 6 are flowcharts explaining an operating process of a data processing apparatus according to an embodiment of the present disclosure.
Figure 6:
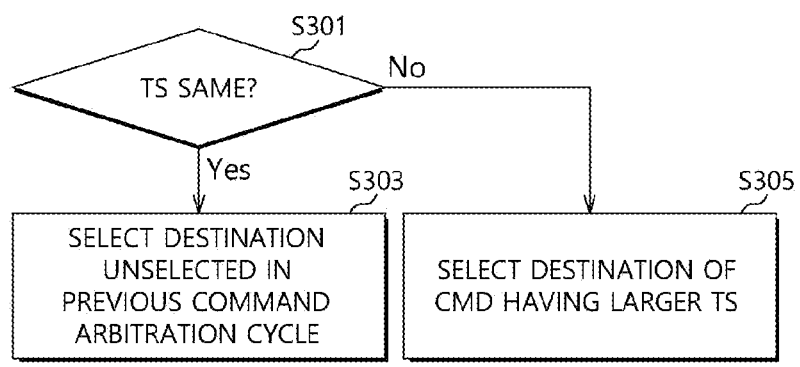

FIGS. 5 and 6 are flowcharts explaining an operating process of a data processing apparatus according to an embodiment.

On receiving a command CMD from a master device 100, the command CMD including a slave address (for example, a memory bank address) and data (in case of a write command) (S101), the arbiter 220 of the controller 200 may assign the time stamp TS to the transmitted command CMD and store the time stamp (TS)-assigned command therein (S103). In embodiments, the time stamp of a TS-assigned command may be used to determine how long the TS-assigned command has been waiting for processing since it was received by the controller 200.

The arbiter 220 may select a command having a largest time stamp value (indicating, for example, that the command that has been waiting the longest for processing) in a tournament manner by comparing commands having different destinations in pairs through the comparison stages of each command arbitration cycle; a detailed description of the process for selecting a command will be provided below.

The arbiter 220 may classify commands according to destinations and based on an arrival order (S201) and determine validity for the command pairs by receiving leading commands classified according to the destinations in pairs (S203). In embodiments, a leading command according to a destination corresponds to a command for processing in the destination that has been waiting the longest for processing.

When it is determined that both two commands in each command pair are valid as a determination result of operation S203, the arbiter 220 may select any one command of the input commands based on the time stamps TS of the input commands and a command selection history of a previous command arbitration cycle (S205). In an embodiment, when the arbiter 220 selects the command based on the time stamps and the command selection history in operation S205, as illustrated in FIG. 6, the arbiter 220 may determine whether or not the time stamp values TS of the input commands are the same as each other (S301). When the input points of time of two input commands are the same or when the time stamp values of two input commands have both converged to the maximum value for a time stamp and thus are the same as each other (S301:Y), the arbiter 220 may select a command for a destination that was not the destination of a command selected in the previous command arbitration cycle, based on the command selection history of the previous command arbitration cycle (S303). When the time stamp values are different from each other (S301: N), the arbiter 220 may select a command of a destination having the larger time stamp value (S305).

When only any one of the input commands is valid as the determination result of operation S203, the arbiter 220 may select the valid command (S207).

When both the input commands are invalid as the determination result of operation S203, the arbiter 220 may discard a comparison result of the corresponding comparison stage and allow the comparison result of the corresponding comparison stage to be neglected in the next comparison stage (S209).

The processes performed in operations S201 to S209 may be repeated every comparison stage and any one command may be selected in the final comparison stage. The processes of operations S201 to S209 performed in the each comparison stages may correspond to one command arbitration cycle.

In embodiments, the commands of the master device may be classified according to the destinations of the commands and queued based on an arrival order in command registers corresponding to the destinations, and the command having the largest time stamp value of the leading commands in the command registers for each of the destinations may be preferentially processed. Determining the largest time stamp value of the leading commands may be done by pair-wise comparisons of commands. However, when the time stamp values of the commands in a command pair are the same as each other, the unprocessed command of a destination unselected in the previous command arbitration cycle is selected based on the command selection history of the previous command arbitration cycle, and thus the commands for the destinations may be uniformly processed.

Figure 7:
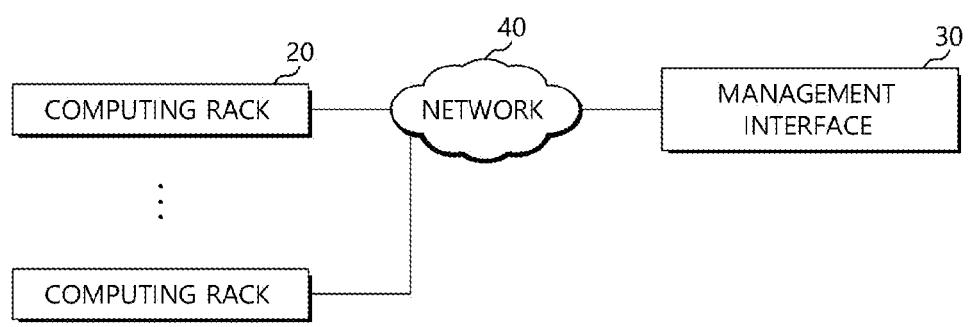
FIG. 7 illustrates a configuration of a data processing system according to an embodiment of the present disclosure.

FIG. 7 illustrates a data processing system 1000 according to an embodiment. The data processing system 1000 may include a plurality of computing racks 20, a management interface 30, and a network 40 configured to enable communication between the computing racks 20 and the management interface 30. The data processing system 1000 may have the rack-scale architecture, and may be used in a data center or the like for large-scale data processing.

Each of the plurality of computing racks 20 may implement one computing system in combination with other computing racks 20. Detailed configurations and operations of the computing racks 20 will be described later.

The management interface 30 may provide interactive interfacing for a user to control, operate, or manage the data processing system 1000. The management interface 30 may be implemented using any type of a computing device including any of a computer, a multi-processor system, a server, a rack-mount server, a board server, a laptop computer, a desktop computer, a tablet computer, a wearable computing system, a network device, a web device, a distributed computing system, a processor-based system, a customer electronic device, and so on.

In some embodiments, the data processing system 1000 may be implemented with a distributed system having computing functions to be performed by the computing racks 20 and user interface functions to be performed by the management interface 30. In other embodiments, the data processing system 1000 may be implemented with a virtual cloud server that includes multi-computing devices distributed through the network 40. The management interface 30 may include a processor, an input/output (I/O) subsystem, a memory, a data storage device, and a communication circuit.

The network 40 may be a channel which exchanges data between the computing racks 20 and the management interface 30 and/or between the computing racks 20. The network 40 may be implemented by various wired and/or wireless networks. For example, the network 40 may include a publicly accessible global network, such as a wired/wireless local area network (LAN), a wide area network (WAN), a cellular network, and/or the Internet. In another example, the network 40 may include one or more subsidiary (or auxiliary) network devices, such as subsidiary (or auxiliary) computers, routers, and switches. In another example, the network 40 may include an interface network based on interface standards, such as cache coherent interconnect for accelerators (CCIX) and GEN-Z.

Figure 8:
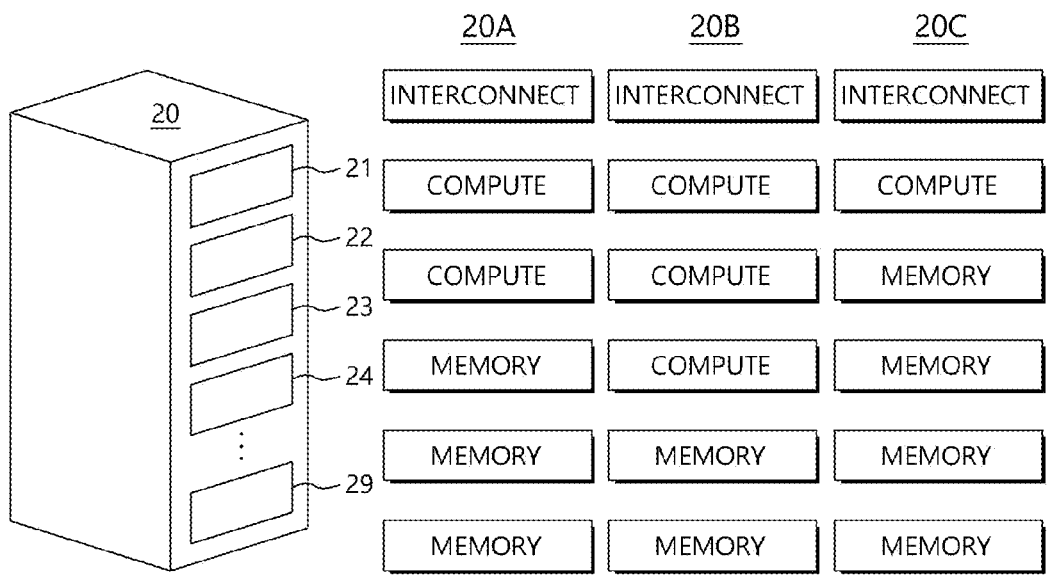
FIG. 8 is a conceptual diagram illustrating a computing rack according to an embodiment of the present disclosure.

FIG. 8 illustrates an architecture of a computing rack 20 according to an embodiment.

Referring to FIG. 8, the computing rack 20 may not be limited by structures, types, and names of components and the like, and the computing rack 20 may include various types of components. For example, the computing rack 20 may include a plurality of drawers 21 to 29. Each of the plurality of drawers 21 to 29 may include a plurality of boards.

In various embodiments, the computing rack 20 may be implemented by a combination of appropriate numbers of compute boards COMPUTE, memory boards MEMORY, and/or interconnect boards INTERCONNECT. Here, although it is defined that the computing rack 20 is implemented by a combination of the plurality of boards, it may be defined that the computing rack 20 is implemented by diversely named components such as drawers, modules, trays, boards, chassis, and units.

The components of the computing rack 20 may have respective architectures classified and distinguished according to their functions for convenience of implementation. The computing rack 20 may have an architecture classified in order of an interconnect board, a compute board, and a memory board from the top, but embodiments are not limited thereto. The computing rack 20 and a computing system implemented by the computing rack 20 may be referred to as "a rack-scale system" or "a disaggregated system." The memory board may be referred to as "a memory system".

In various embodiments, a computing system may be implemented by one computing rack 20. In other embodiments, a computing system may be implemented by all components included in two or more computing racks, some of components included in two or more computing racks, or some of components included in one computing rack 20.

In various embodiments, a computing system may be implemented by a combination of appropriate numbers of compute boards, memory boards, and interconnect boards included in the computing rack 20. As illustrated in FIG. 8, a computing rack 20A may be implemented by a combination of two compute boards COMPUTE, three memory boards MEMORY, and one interconnect board INTERCONNECT. In another example, a computing rack 20B may be implemented by a combination of three compute boards COMPUTE, two memory boards MEMORY, and one interconnect board INTERCONNECT. In still another example, a computing rack 20C may be implemented by a combination of one compute board COMPUTE, four memory boards MEMORY, and one interconnect board INTERCONNECT.

Although FIG. 8 illustrates examples wherein the computing rack 20 is implemented by a combination of appropriate numbers of compute boards, memory boards, and interconnect boards, the computing rack 20 may include additional components that may be included in typical servers, such as a power system, a cooling system, an I/O device, and the like.

Figure 9:
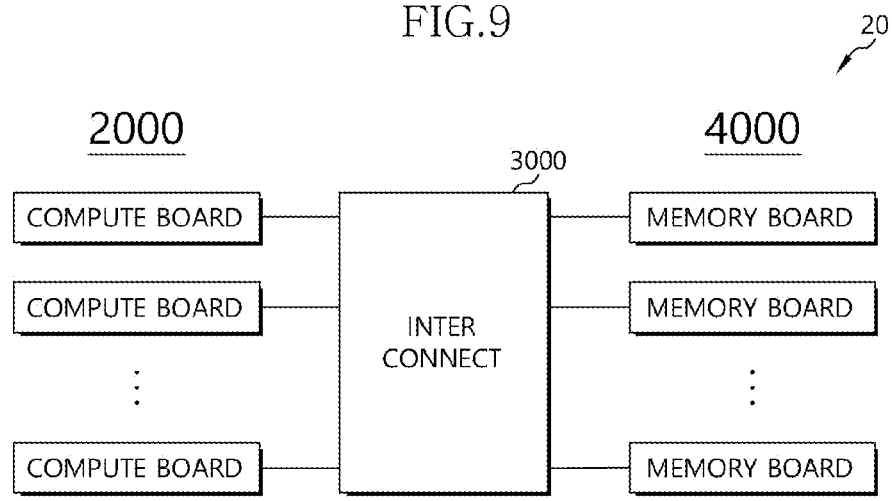
FIG. 9 illustrates a configuration of a computing rack according to an embodiment of the present disclosure.

FIG. 9 illustrates a configuration of a computing rack 20 according to an embodiment.

Referring to FIG. 9, the computing rack 20 may include a plurality of compute boards 2000, a plurality of memory boards 4000, and an interconnect board 3000. The plurality of compute boards 2000 may be referred to as pooled compute boards, pooled compute systems, or the like. Similarly, the plurality of memory boards may be referred to as pooled memory boards, pooled memory systems, or the like. Here, although it is defined that a computing rack or system is implemented by a combination of a plurality of boards, the computing rack or system may be implemented by diversely named components such as drawers, modules, trays, boards, chassis, or units.

Each of the plurality of compute boards 2000 may include one or more processing elements in which hardware such as one or more of processors, processing/control circuits, and central processing units (CPUs) and software executable on the hardware are combined.

Each of the plurality of memory boards 4000 may include one or more of memories such as volatile memories and nonvolatile memories. For example, each of the plurality of memory boards 4000 may include dynamic random access memories (DRAMs), flash memories, memory cards, hard disc drives (HDDs), solid state drives (SSDs), or a combination thereof.

Each of the plurality of memory boards 4000 may be divided, allocated, or designated by and used by one or more processing elements included in each of the compute boards 2000. Each of the plurality of memory boards 4000 may store one or more operating systems (OSs) to be initialized and/or executed by the compute boards 2000.

The interconnect board 3000 may be implemented by communication circuits, communication devices, or a combination thereof, which may be divided, allocated, and designated by and used by one or more processing elements included in each of the compute boards 2000. For example, the interconnect board 3000 may be implemented by an arbitrary number of network interface ports, interface cards, or interface switches. The interconnect board 3000 may use protocols associated with one or more wired or wireless communication technologies for executing communication. For example, the interconnect board 3000 may support communication between the compute boards 2000 and the memory boards 4000 according to one or more of protocols such as peripheral component interconnect express (PCIe), quick path interconnect (QPI), Ethernet, and the like. The interconnect board 3000 may be coupled to the compute boards 2000 by interface standards such as CCIX and GEN-Z.

Figure 10:
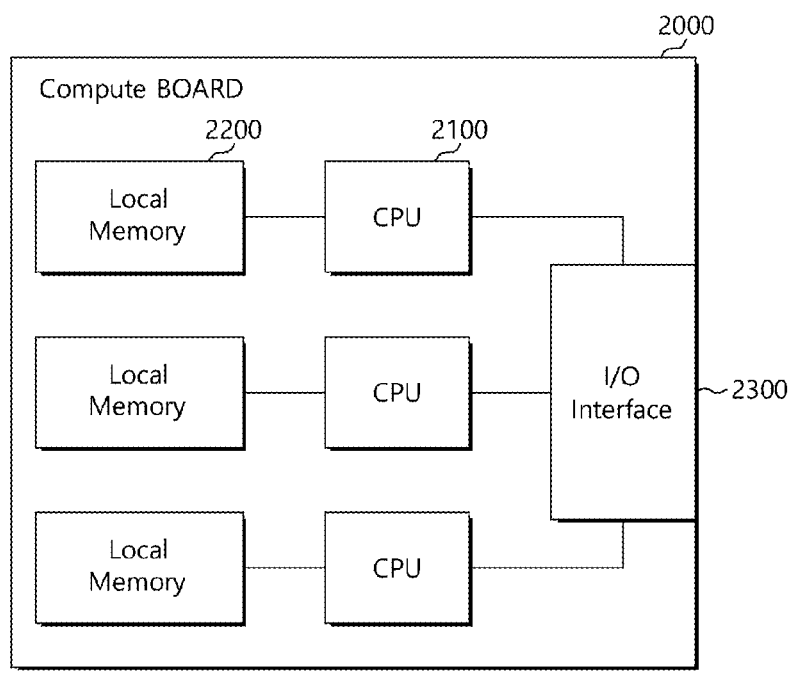
FIG. 10 illustrates a configuration of an operation board according to an embodiment of the present disclosure.

FIG. 10 illustrates a configuration of the compute board 2000 shown in FIG. 9 according to an embodiment.

Referring to FIG. 10, the compute board 2000 may include a plurality of CPUs 2100, a plurality of local memories 2200, and an I/O interface 2300.

The CPUs 2100 may divide, allocate, or designate one or more memory boards to be used among the plurality of memory boards 4000 illustrated in FIG. 9. The CPUs 2100 may initialize the one or more memory boards that are divided, allocated, or designated, and perform a data read operation, a data write (or program) operation, and the like on the one or more memory boards.

The local memories 2200 may store data required to perform operations of the CPUs 2100. In various embodiments, the local memories 2200 may be in a one-to-one correspondence with the CPUs 2100.

The I/O interface 2300 may support interfacing between the CPUs 2100 and the memory boards 4000 through the interconnect boards 3000 of FIG. 9. The I/O interface 2300 may output data from the CPUs 2100 to the interconnect board 3000 and input data from the interconnect board 3000 to the CPUs 2100, using protocols associated with one or more wired or wireless communication technologies. For example, the I/O interface 2300 may support communication between the CPUs 2100 and the interconnect board 3000 according to one or more of protocols such as PCIe, QPI, Ethernet, and the like. The I/O interface 2300 may support communication between the CPUs 2100 and the interconnect board 3000 according to interface standards such as CCIX and GEN-Z.

Figure 11:
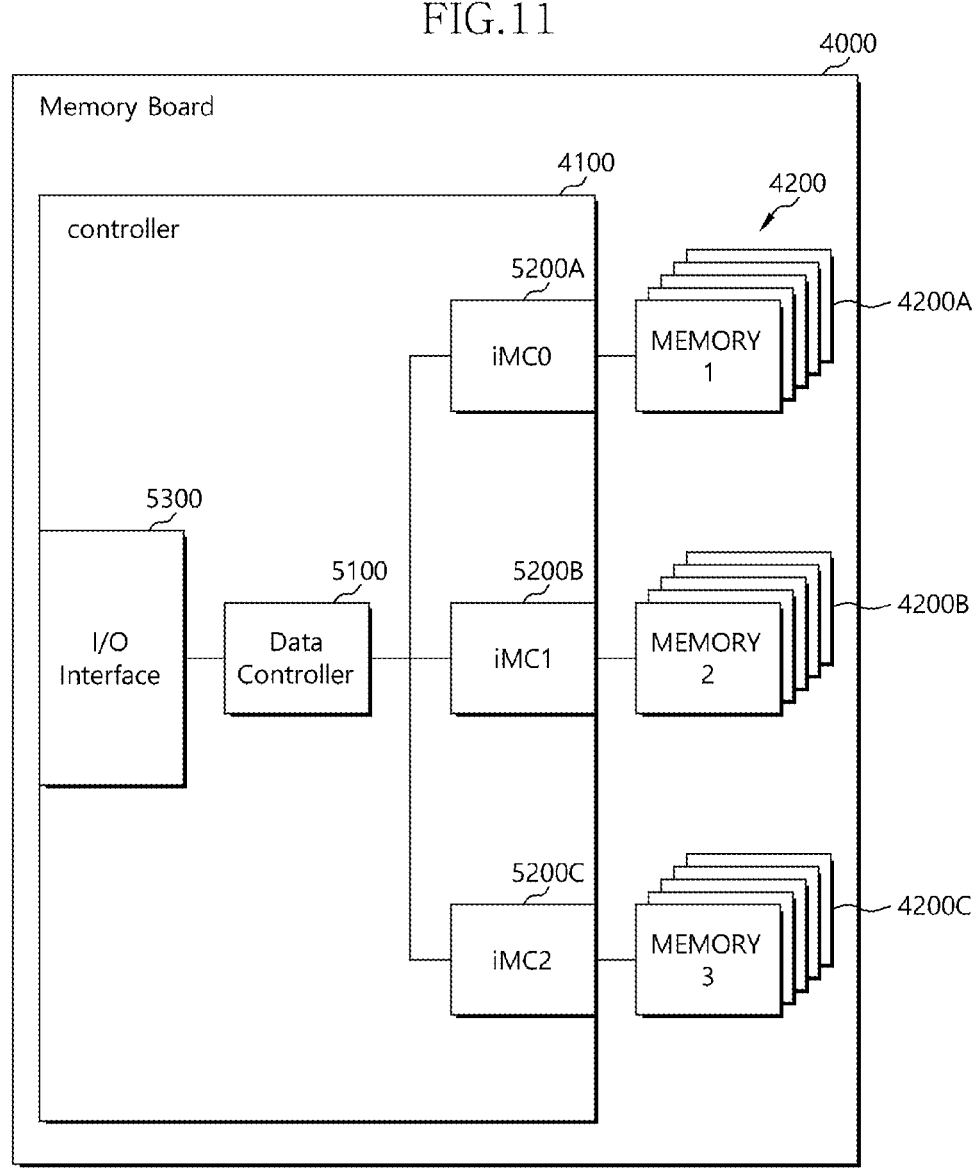
FIG. 11 illustrates a configuration of a memory board according to an embodiment of the present disclosure.

FIG. 11 is a diagram illustrating a configuration of a memory board 4000 according to an embodiment.

Referring to FIG. 11, a memory board 4000 may include a controller 4100 and a plurality of memory groups 4200. The memory groups 4200 may include one or more types of memory devices 4200A, 4200B, and 4200C. The memory devices 4200A, 4200B, and 4200C may store (write) data and output (read) stored data, according to control of the controller 4100. The plurality of memory groups 4200 may include a first memory device 4200A, a second memory device 4200B, and a third memory device 4200C. The first to third memory devices 4200A, 4200B, and 4200C may have the same characteristic as each other or different characteristics from each other. In various embodiments, the first to third memory devices 4200A, 4200B, and 4200C may be memory devices having the same characteristic as each other or different characteristics from each other, in terms of storage capacity or latency.

The controller 4100 may include an input/output (I/O) interface 5300, a data controller 5100, and a plurality of memory controllers iMC0 to iMC2 (shown as memory controllers 5200A, 5200B, and 5200C) as memory interfaces respectively corresponding to the memory groups 4200.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data processing apparatus, comprising:
a master device configured to transmit commands including a bank address for a slave device to process a command;
the slave device configured to include a plurality of memory banks to process a command, wherein bank addresses are respectively assigned to each of the plurality of memory banks; and
a controller configured to relay communication between the master device and the slave device, wherein the controller:
assigns a time stamp value to each of the commands as an initial value when the commands are received by the controller and increments the time stamp value every command arbitration cycle,
selects a command having a largest time stamp value among the commands by comparing the time stamp values between commands to be processed in the memory banks each having different bank addresses every command arbitration cycle,
stores a command selection history of each comparison of commands, and
selects the command based on the command selection history corresponding to the each of the commands for which the time stamp value is compared when respective time stamp values of the compared commands are the same as each other,
wherein the controller is configured to discard a comparison result of a current comparison stage without transmitting the comparison result of the current comparison stage to next comparison stage when the compared commands are invalid.

2. The data processing apparatus of claim 1, wherein the controller is configured to select the command based on the respective time stamp values of the compared commands and the command selection history corresponding to the compared commands when the compared commands are valid.

3. The data processing apparatus of claim 1, wherein the controller is configured to select a valid command when any one of the compared commands is valid.

4. The data processing apparatus of claim 1, wherein the controller is configured to select a command having a largest time stamp value among the commands in a tournament manner.

5. A data processing apparatus, comprising:
a master device configured to transmit commands including a bank address for a slave device;
the slave device including a plurality of memory banks to process a command, wherein bank addresses are respectively assigned to each of the plurality of memory banks; and
a controller configured to relay communication between the master device and the slave device, wherein the controller includes:
a time stamp setter configured to assign time stamp values to each of the commands as an initial value when the commands was received by the controller;
a counter configured to increment the time stamp value every command arbitration cycle;
a command register configured to store time stamp-assigned commands according to an arrival order; and
a scheduler configured to classify the time stamp-assigned commands according to the bank addresses of memory banks to be processed of each of the time stamp-assigned commands and based on the arrival order, and select any one of leading commands for the bank address based on the time stamp values, the scheduler selecting a command based on a command selection history of a previous command arbitration cycle,
wherein the scheduler is configured to discard a comparison result of a current comparison stage without transmitting the comparison result of the current comparison stage to next comparison stage when the compared commands are invalid.

6. The data processing apparatus of claim 5, wherein the scheduler selects the command based on the command selection history when time stamp values of two or more of the leading commands are the same as each other, and
wherein the scheduler selects, based on the command selection history, a command for a bank address not corresponding to a bank address of a command selected in the previous command arbitration cycle.

7. The data processing apparatus of claim 5, wherein the scheduler includes a plurality of comparison stages, and
each of the comparison stages includes a comparison circuit configured to select any one of commands having different bank addresses in response to characteristics of the commands and the command selection history, and to feed back a selection result as the command selection history every command arbitration cycle.

8. The data processing apparatus of claim 7, wherein the comparison circuit selects one of the pair of commands based on the respective time stamp values of the pair of commands and the command selection history when both of the pair of commands are valid.

9. The data processing apparatus of claim 7, wherein the comparison circuit selects a valid command when any one of the commands is valid.

10. A method for a data processing apparatus including a controller, a master device, and a slave device, the method comprising:
assigning time stamp value to each of the commands as an initial value when the commands was received by the controller and storing time stamp-assigned commands therein;
incrementing the time stamp value every command arbitration cycle;
classifying the time stamp-assigned commands according to a bank address of each of memory banks to be processed in each of the time stamp-assigned commands based on an arrival order;
selecting any one of leading commands for the memory banks based on the time stamp values; and
selecting a command based on a command selection history of a previous command arbitration cycle,
wherein selecting any one of leading commands for the memory banks includes:
determining validity of the commands of the command pair to be compared; and
discarding a comparison result of a current comparison stage without transmitting the comparison result of the current comparison stage to next comparison stage when both of the commands in the command pair to be compared are invalid.

11. The method of claim 10, wherein the command is selected based on the command selection history of the previous command arbitration cycle when the stamp values of two or more of the leading commands are the same as each other.

12. The method of claim 11, wherein selecting the command when the time stamp values are the same as each other includes selecting, based on the command selection history, a command for a memory bank not selected in the previous command arbitration cycle.

13. The method of claim 11, wherein selecting the one of the leading commands for the memory bank includes:
comparing time stamp values of the commands having different memory banks in pairs;
selecting any one of the commands in each command pair in response to a time stamp value comparison result and the command selection history; and
feeding back a selection result of each command arbitration cycle as the command selection history.

14. The method of claim 13, wherein selecting the any one of the commands in each command pair includes:
determining validity of the commands of the command pair to be compared; and
selecting the command based on the time stamp value comparison result and the command selection history when both of the commands in the command pair to be compared are valid.

15. The method of claim 13, wherein the selecting of the any one of the commands in each command pair includes:
determining validity of the commands of the command pair to be compared; and
selecting a valid command when any one of the commands in the command pair to be compared is valid.

* * * * *